(12) United States Patent
Gineris et al.

(10) Patent No.: US 6,684,569 B2
(45) Date of Patent: Feb. 3, 2004

(54) SELF-CLOSING ACCESS DOOR

(75) Inventors: Michael Brian Gineris, Whittier, CA (US); Aubrey Lee Stewart, Huntington Beach, CA (US); Christopher Howard Fieler, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/892,262

(22) Filed: Jun. 27, 2001

(65) Prior Publication Data

US 2003/0001047 A1 Jan. 2, 2003

(51) Int. Cl.[7] ............................... E05F 1/00; B64C 1/14
(52) U.S. Cl. ..................... 49/379; 244/129.4; 220/745; 114/201 R
(58) Field of Search ......................... 49/463, 465, 507, 49/379; 16/285, 277, 50, 287, 289; 220/203.1, 203.27, 829, 745; 292/80, 81, 87, 128, 256.5; 52/20, 1; 244/129.1, 129.3, 129.4, 129.5; 114/201 R, 203, 177

(56) References Cited

U.S. PATENT DOCUMENTS

| | | | | | |
|---|---|---|---|---|---|
| 1,455,513 A | * | 5/1923 | Von Tell | ................ | 114/201 R |
| 2,279,666 A | * | 4/1942 | Etnyre | ................... | 220/203.1 |
| 2,664,947 A | * | 1/1954 | Aarvold | .................. | 244/129.5 |
| 3,183,548 A | * | 5/1965 | Speakman | .............. | 244/129.5 |
| 3,571,977 A | * | 3/1971 | Abeel | ........................ | 49/379 |
| 3,622,197 A | * | 11/1971 | Vogelei et al. | ........... | 49/340 X |
| 3,718,171 A | * | 2/1973 | Godwin | ................... | 244/129.5 |
| 3,733,750 A | * | 5/1973 | Hege | .......................... | 49/379 |
| 3,758,919 A | * | 9/1973 | Dilworth, Jr. | ........... | 292/250 X |
| 3,948,469 A | * | 4/1976 | Brown | ........................ | 244/54 |
| 4,517,765 A | * | 5/1985 | Mucha | .................... | 49/379 X |
| 4,845,810 A | * | 7/1989 | Brown et al. | ................ | 16/284 |
| 5,122,067 A | | 6/1992 | Sunne | | |
| 5,133,517 A | | 7/1992 | Ware | | |
| 5,335,451 A | * | 8/1994 | Druzynski | .................. | 49/379 |
| 5,465,862 A | * | 11/1995 | Devlin | ....................... | 220/335 |
| 5,526,999 A | | 6/1996 | Meston | | |
| 5,750,915 A | | 5/1998 | Bedegrew et al. | | |
| 5,810,412 A | * | 9/1998 | Hall | ........................... | 49/56 X |
| RE36,436 E | * | 12/1999 | Kyle | ......................... | 16/285 X |
| 6,061,874 A | * | 5/2000 | Tatara | ......................... | 16/285 |

* cited by examiner

*Primary Examiner*—Hugh B. Thompson
(74) *Attorney, Agent, or Firm*—Harness Dickey & Pierce P.L.C.

(57) ABSTRACT

A self-closing access door for use with external umbilicals in aerospace launch vehicles is provided. The self-closing access door comprises two door panels joined by a spring-loaded hinge, the latter of which is attached to surrounding structure of the vehicle. When an external source is applied to the door panels, the panels are opened such that fluid flow, i.e. air conditioning, may enter the vehicle from the external umbilical. When the external source is removed, the spring-loaded hinge forces the door panels closed. The self-closing access door further comprises latches on each door panel that firmly secure the door panels to the surrounding structure. A cover plate is also provided that includes an outer lip for attachment to the surrounding structure and an inner lip, which is engaged by the latches. The spring-loaded hinge also comprises a door stop that limits the distance that the door panels may be opened.

29 Claims, 6 Drawing Sheets

SELF-CLOSING ACCESS DOOR

FIELD OF THE INVENTION

The present invention relates generally to access doors and more particularly to access doors for aerospace vehicles that are opened by an external umbilical for purposes such as pre-launch environmental control.

BACKGROUND OF THE INVENTION

Aerospace launch vehicles such as rockets comprise a plurality of access doors and covers through their outer moldline surfaces for access to internal structure and subsystems. One type of access door of the known art provides internal access to a launch vehicle, which may include an internal manifold and ducting, for pre-launch environmental control such as air conditioning. In operation, an external detachable umbilical forces the access door open and induces a flow of air from the umbilical into the launch vehicle through the internal manifolds and ducting. When the air flow must be discontinued, the umbilical is removed from the launch vehicle and the access door automatically closes.

The access door must be capable of closing automatically because the umbilical is removed during lift-off of the launch vehicle. Accordingly, the access doors must be opened by an external umbilical and must further be self-closing or closed by a remote device. Moreover, the access doors must be capable of remaining closed during launch, thereby withstanding the dynamic, thermal, and pressure environments induced during flight.

One self-closing access door of the known art uses a pan-shaped plug that is circumferentially spring-loaded with extension springs to hold the door closed. Generally, the springs are mounted to the rear of the plug and to the internal moldline of the vehicle structure. When the door is forced open by an external source, the rear of the plug moves which extends the springs. When the external source is removed, the springs force the door closed against the vehicle structure. However, there is no additional mechanism to automatically secure the door to the vehicle structure after the external source is removed.

In one form, the access door comprises twenty (20) extension springs positioned around the circumference of the plug, along with a plurality of additional structure and fasteners to support operation of the access door. As a result, the access door is relatively complicated and requires a substantial amount of resources for fabrication and assembly, especially at the vehicle level. The completed access door assembly in one known form weighs approximately 15 pounds, which is relatively heavy for an aerospace application.

In operation, the extension springs are designed to maintain a minimum load, i.e. prevent the door from opening under a certain load, while the door is closed. A load approximately four times the minimum load is required to fully open the door due to the number of extension springs employed. Accordingly, if a launch vehicle increases in size and must be designed for more extreme environments during flight, the access door of the known art will only further increase in complexity and cost.

Other known art access doors employ externally mounted spring-loaded hinges, wherein the external umbilical system lifts the door up and swings the door into an open position to induce the air flow. When the air flow is to be discontinued, the umbilical releases the door and the spring-loaded hinge forces the door closed against the outer moldline surface of the vehicle. Unfortunately, since the access door must swing out and into the path of the umbilical, the access door may interfere with the umbilical and cause problems with release of the umbilical during lift-off. As a result, both the umbilical system and the launch vehicle may be damaged, which could possibly threaten the safety of flight operations.

Additional known art access doors comprise a sliding guillotine door, wherein the umbilical system slides the door up and open to induce the fluid flow. However, the design of the sliding guillotine door is relatively complex in order to withstand the flight environment after launch, and the probability of the sliding door binding during flight operations is relatively high. As a result, the sliding guillotine door is undesirable for a variety of launch vehicles and environments.

Known art access doors, therefore, are relatively complex and may be incapable of withstanding certain launch environments. As a result, access doors have been structurally complex, which results in heavier and more expensive launch vehicles. Furthermore, access doors of the known art increase the probability of failure of the umbilical system and/or the access door during launch operations when the umbilical fails to release from the launch vehicle.

Accordingly, there remains a need in the art for a reliable self-closing access door that comprises a relatively simple structure in order to reduce weight and further to simplify fabrication and assembly for reduced costs.

SUMMARY OF THE INVENTION

In one preferred form, the present invention provides a self-closing access door that comprises two (2) door panels secured to a spring-loaded hinge that is further secured to surrounding structure. The spring-loaded hinge holds the door closed against the surrounding structure, and when an external source such as a umbilical engages one or both of the panels, the panels are forced open against the forces applied by the spring-loaded hinge. When the external source is removed from the door panels, the spring-loaded hinge forces the door panels closed against the surrounding structure.

The self-closing access door further comprises a plurality of latches that are attached to the door panels to firmly secure the door panels to the surrounding structure. The latches are preferably attached to the door panels using latch supports, which are generally L-shaped brackets attached to the interior of the door panels. The latches further comprise latch hooks, which specifically engage the surrounding structure to secure the door panels in the closed position.

In another preferred form, the self-closing access door of the present invention comprises a cover plate that is attached to the surrounding structure. The spring-loaded hinge is secured to the cover plate rather than directly to the surrounding structure, and the latches engage the cover plate to firmly secure the door panels in the closed position. Generally, the cover plate is circular in shape and defines a hollow center portion. The cover plate further comprises a lateral support that extends across the hollow center portion, an inner lip, and an outer lip. The spring-loaded hinge is secured along the lateral support and thus extends across the hollow center portion of the cover plate. The outer lip is attached to the surrounding structure, and the latches engage the inner lip to secure the door panels in the closed position.

To limit the overall distance that the door panels are opened, the spring-loaded hinge further comprises a door stop. The door stop generally defines a "C" configuration, thereby having a flange on each side. Additionally, the door stop is separately attached to the spring-loaded hinge in the preferred embodiment of the present invention. The door panels are preferably secured to the spring-loaded hinge using rivets, and the spring-loaded hinge further comprises a tab portion on each side of the spring-loaded hinge adjacent the door stop. Accordingly, when the door panels are opened a certain predetermined distance, the tab portions along the spring-loaded hinge engage the flanges of the door stop to prevent further movement of the door panels. The door stop is also preferably riveted to the spring-loaded hinge, although other attachment methods known in the art such as adhesive bonding may also be employed.

When the self-closing access door is assembled to the launch vehicle, the hinge-line of the spring-loaded hinge is aligned with the direction of flight of the launch vehicle. The hinge-line is aligned with the direction of flight, and also the direction of the air stream, so that the probability of aerodynamic forces opening the door panels during flight is minimized.

In operation, the latches are manually or automatically disengaged, and an external umbilical engages the outer surface of the door panels to apply an inward force to open the access door until the tab portions of the spring-loaded hinge engage the flanges of the door stop. Once the door panels are open, the umbilical system induces fluid flow, e.g. air conditioning, into a manifold and additional ducting within the launch vehicle. When the fluid flow must be discontinued, the umbilical is removed from the door panels and the spring-loaded hinge forces the door panels closed against the inner lip of the cover plate. The latch hooks then engage the inner lip of the cover plate to firmly secure the door panels to the cover plate so that the door panels do not open during flight operations.

As a result, a relatively simple and reliable self-closing access door is provided that has a minimal number of parts and is relatively light weight. The self-closing access door is furthermore simple to fabricate and assemble to the launch vehicle, thereby providing both weight and cost savings over access doors of the known art.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
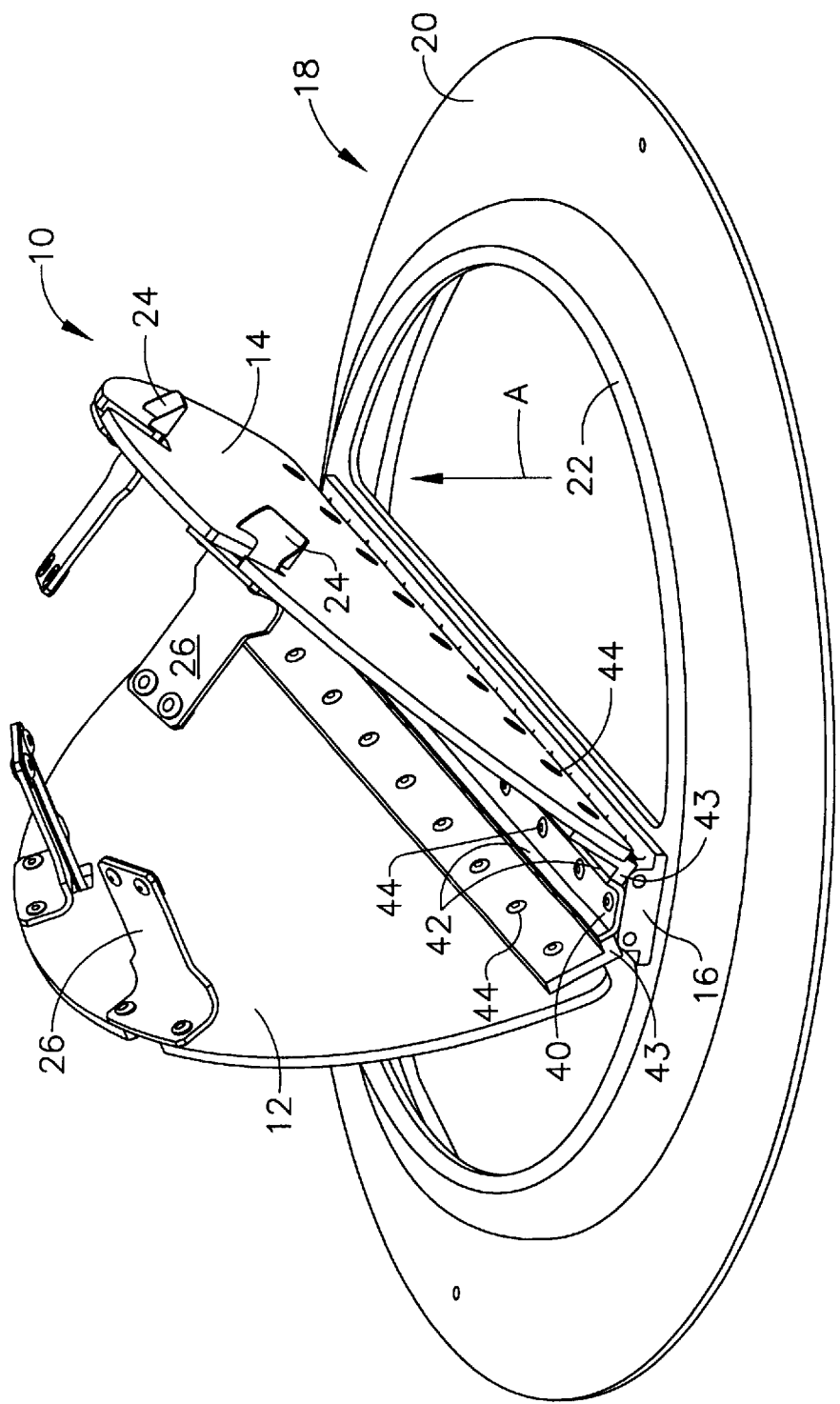
FIG. 1 is an orthogonal view of a self-closing access door in the open position in accordance with the present invention.
Figure 2:
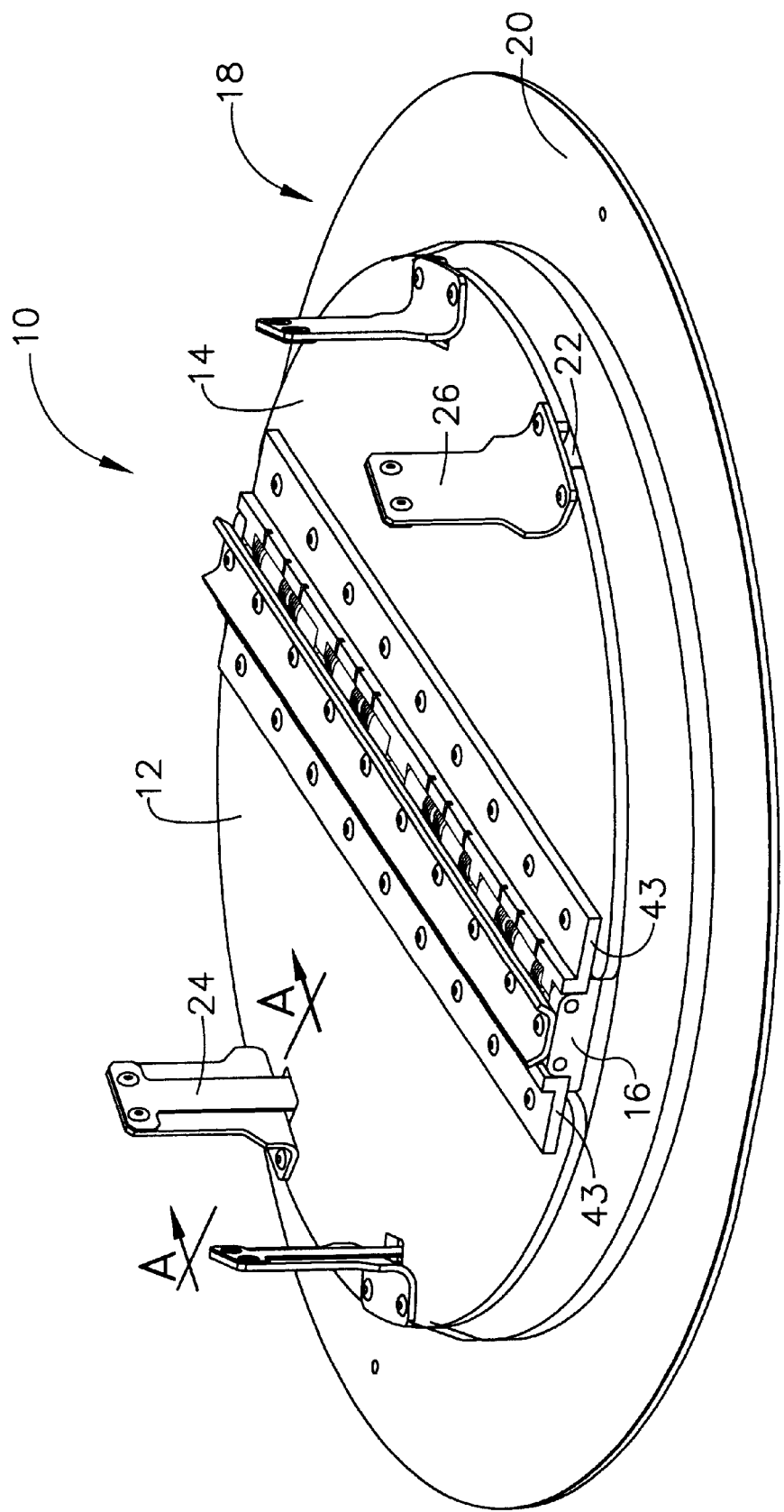
FIG. 2 is an orthogonal view of a self-closing access door in the closed position in accordance with the present invention.

Referring to the drawings, the self-closing access door of the present invention is illustrated and generally indicated by reference numeral 10 in FIGS. 1 and 2. As shown, the self-closing access door 10 comprises a first door panel 12 and a second door panel 14, which are joined by a spring-loaded hinge 16. Generally, the door panels 12 and 14 are opened by applying an external source in the direction of arrow A to either or both of door panels 12 and 14. When the external source is removed, spring-loaded hinge 16 forces the door panels 12 and 14 closed against surrounding structure such as the cover plate 18 as illustrated.

The application of the self-closing access door 10 to an aerospace vehicle should not be construed as limiting the invention; rather, the application to aerospace is merely illustrative of one structure and one operating environment in which the present invention has particular utility. The self-closing access door 10 of the present invention can further be employed with a wide variety of applications that require a self-closing access door.

As shown, the spring-loaded hinge 16 is further attached to the cover plate 18, which is secured to surrounding structure (not shown) of the launch vehicle. Accordingly, the spring-loaded hinge 16 is secured to the inside of the vehicle and is thus an internal hinge rather than an external hinge. Alternately, the spring-loaded hinge 16 may be secured directly to the surrounding structure of the vehicle rather than to the cover plate 18. Cover plate 18 comprises an outer lip 20 that is attached to the surrounding structure of the vehicle, and an inner lip 22 that is used to further secure the door panels 12 and 14 as more fully described below.

The self-closing access door 10 of the present invention further comprises a plurality of latches 24 that are secured to the door panels 12 and 14. As shown, latch supports 26 are used to secure the latches 24 to the door panels 12 and 14. Although four (4) latches 24 are illustrated, any number of latches 24 may be employed according to specific design requirements of an access door application. Accordingly, the door panels 12 and 14 are firmly secured to the cover plate 18 using latches 24 as described in greater detail below.

Figure 3:
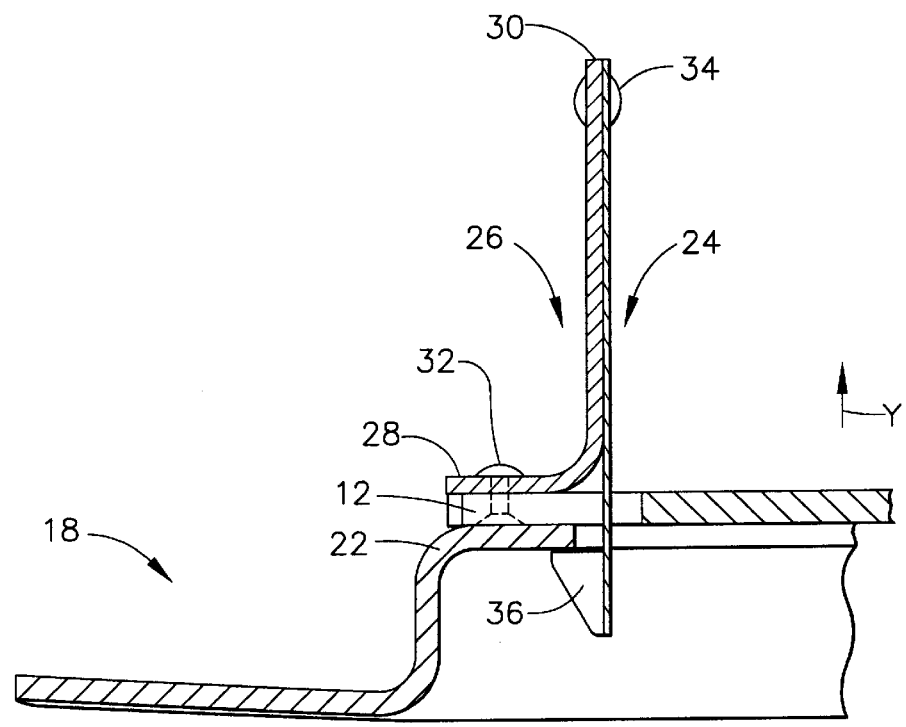
FIG. 3 is a cross-sectional view, taken alone line A—A of FIG. 2, illustrating a latch engaged with the inner lip of the cover plate to secure a self-closing access door in the closed position in accordance with the present invention.

Referring to FIG. 3, latch 24 further comprises a latch hook 36 that engages the inner lip 22 of the cover plate 18 to firmly secure door panel 12. As shown, latch hook 36 engages inner lip 22 when the door panel 12 is in the closed position, and as a result, a limited force from an external source, i.e. aerodynamic loads, applied in the direction of arrow Y will not open the door panel 12. As a result, door panel 12 is held securely closed from both the force of spring-loaded hinge 16 as well as the latches 24.

As further shown, latch supports 26 comprise an "L" configuration, wherein the lower flange 28 is fastened to the door panel 12, and the upper flange 30 is fastened to the latch 24. The latch supports 26 are preferably fastened using solid rivets 32 and 34 as shown, however, other fastening methods known in the art, such as adhesive bonding, may also be employed. As illustrated, flush-head rivets 32 are used to fasten the latch supports 26 to the door panel 12 to allow the door panel 12 to close flush against the inner lip 22 of the cover plate 18. Protruding-head rivets 34 are preferably used to fasten the latch supports 26 to the latches 24 due to their lower acquisition and installation cost. Alternately, latch 24 may comprise a unitized configuration (not shown) wherein the lower flange 28 and the upper flange 30 are an integral part of the latch 24.

Figure 4:
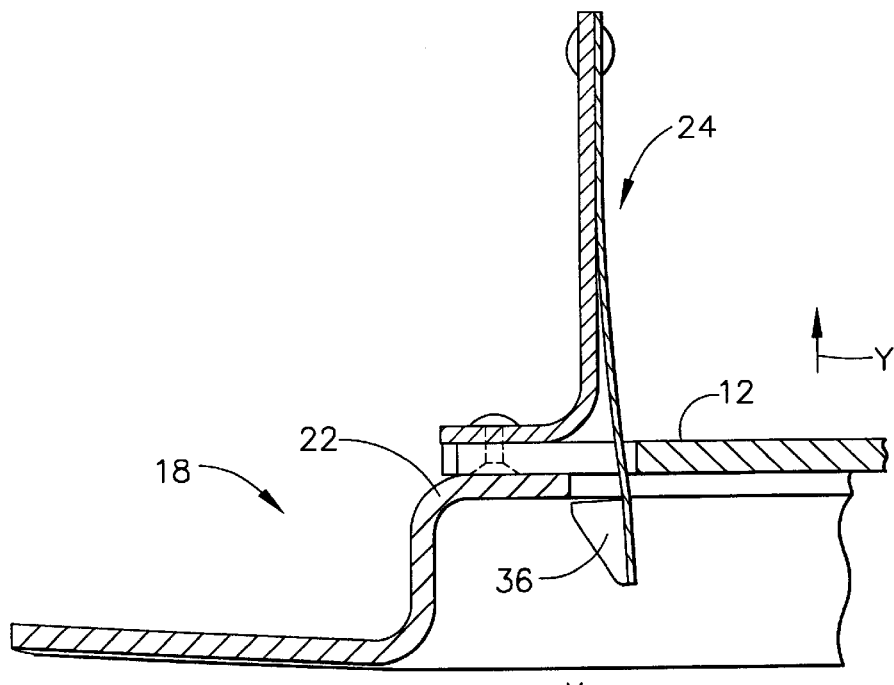
FIG. 4 is a cross-sectional view, taken alone line A—A of FIG. 2, illustrating a latch disengaged with the inner lip of the cover plate to enable a self-closing access door to be opened by an external source in accordance with the present invention.

Referring to FIG. 4, latch 24 is disengaged by depressing the latch hook 36 in the direction of arrow X such that the latch hook 36 is positioned away from the inner lip 22 as shown. Once the latch hook 36 is free from the inner lip 22, an external source may be applied to the door panel 12 in the direction of arrow Y to open the door panel 12. Accordingly, the latch hook 36 is preferably a thin gauge flexible, yet durable, material such as stainless steel. Preferably, the latch 24 has a thickness of approximately 0.060 inches (1.524 mm) for one application of the present invention to a launch vehicle.

With the preferable material and configuration of the latch 24, approximately one pound of force is required to sufficiently depress the latch hook 36 in order to open door panels 12 and 14. Additionally, each latch 24 can withstand approximately 28 pounds of combined shock and pressure loads, which equates to approximately 112 pounds of combined pressure and shock loading that the self-closing access door 10 can withstand.

Depending on the size of the self-closing access door 10 and the magnitude and direction of aerodynamic loads, the number, material, and configuration of latches 24 may vary accordingly. Furthermore, other devices may also be employed to firmly secure the door panels 12 and 14 to the cover plate 18 or surrounding structure of the vehicle, including but not limited to, metallic hook and loop fasteners, other latch configurations, magnetic fasteners, and other mechanical fasteners. Additionally, the latches 24 may alternately be secured directly to the structure of the vehicle, provided that structure has a feature similar to inner lip 22 that latch hooks 36 may engage.

Referring back to FIGS. 1 and 2, spring-loaded hinge 16 further comprises a door stop 40 attached thereto. Generally, door stop 40 is provided to limit the distance that door panels 12 and 14 may move when opened by an external source. The door stop 40 is generally a "C" configuration that defines flanges 42 extending therefrom. Furthermore, the spring-loaded hinge 16 comprises tab portions 43 adjacent the door stop 40. Accordingly, when the door panels 12 and 14 are opened in the direction of arrow A a predetermined distance, the tab portions 43 contact the flanges 42, thereby preventing further movement of the door panels 12 and 14.

The door stop 40 is also preferably attached to the spring-loaded hinge 16 using rivets 44. The number and spacing of rivets 44 depends on the structural loads applied to spring-loaded hinge 16 and door panels 12 and 14, in addition to manufacturing and supportability requirements, and will vary accordingly. Further, the rivets 44 are preferably a flush-head configuration as illustrated so that the rivet head does not protrude from the vehicle and into the air stream during flight operations.

Alternatively, the spring-loaded hinge 16 may be adhesively bonded to the door panels 12 and 14. Additionally, door stop 40 may also be adhesively bonded to the spring-loaded hinge 16 rather than using the rivets 44 as shown. Moreover, the door stop 40 may also be an integral feature of spring-loaded hinge 26 rather than a separate piece.

Figure 5:
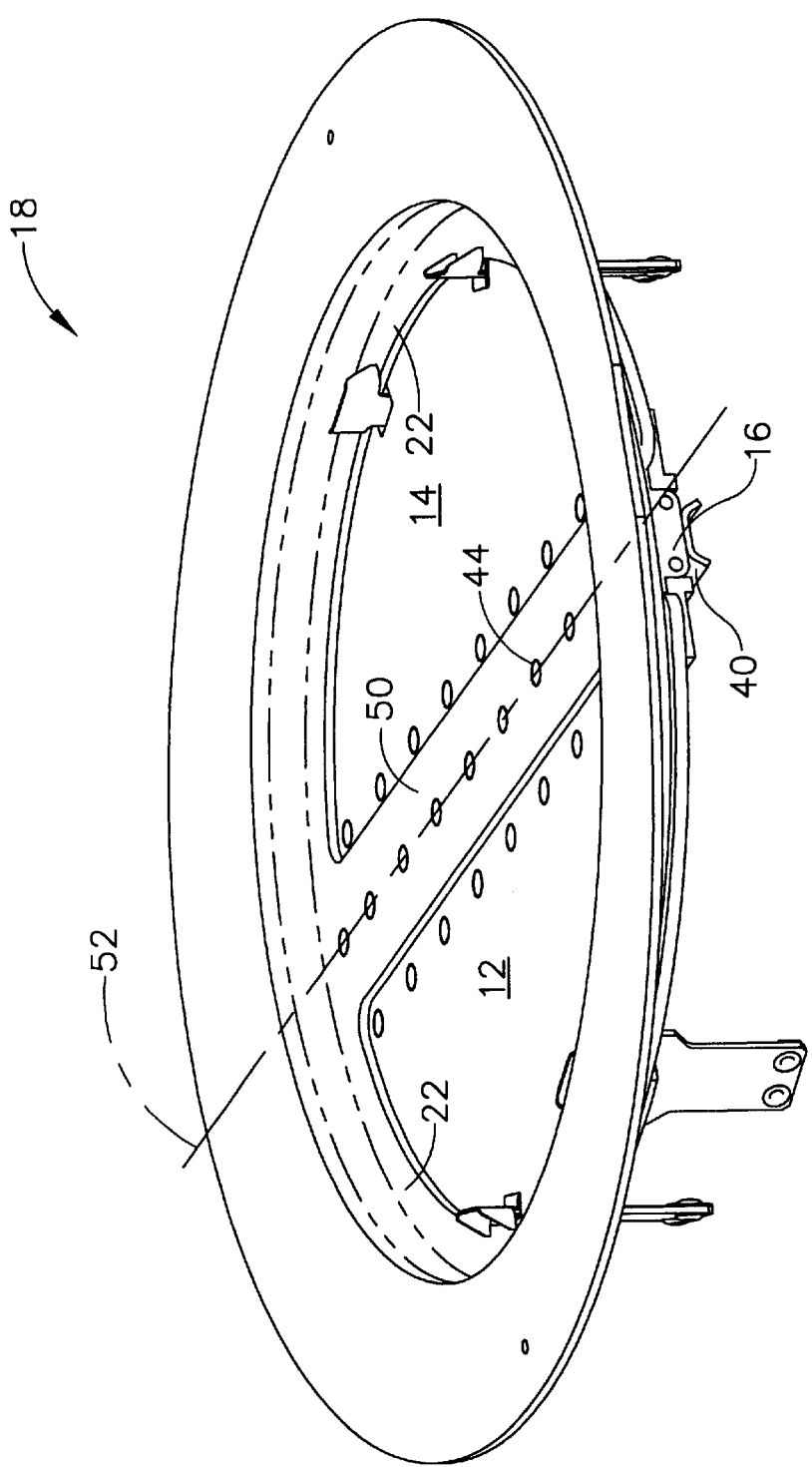
FIG. 5 is an orthogonal view of the lateral support of the cover plate in accordance with the present invention.

Referring to FIG. 5, cover plate 18 further comprises a lateral support 50 that extends across a hollow center portion thereof. The lateral support 50 provides a support for the spring-loaded hinge 16, wherein the spring-loaded hinge 16 is attached to the lateral support 50 using rivets 44 as shown. Accordingly, the internal loads within the spring-loaded hinge 16 are transferred through the lateral support 50 to the cover plate 18, and are then transferred to the surrounding structure of the vehicle. The rivets 44 are the same type of rivets that are used to secure door stop 40 to the spring-loaded hinge 16 as previously described. Accordingly, the rivets 44 are a flush-head configuration to minimize aerodynamic drag during flight operations.

As further shown in FIG. 5, spring-loaded hinge 16 defines a hinge-line 52 that extends along the direction of spring-loaded hinge 16. In operation, the hinge-line 52 is aligned with the direction of flight of the aerospace vehicle and also the direction of the air stream during flight, so that the probability of aerodynamic forces opening the door panels is minimized. Additionally, the hinge-line 52 may also be aligned with internal forces that are also in the direction of the hinge-line 52 for load-path continuity.

Alternately, spring-loaded hinge 16 may be directly attached to the cover plate 18 or to surrounding structure of the vehicle rather than to a lateral support 50. As a result, the cover plate 18 and the surrounding structure will be thicker and thus heavier in order to support the loads introduced by the spring-loaded hinge 16 from the external source when the door panels 12 and 14 are opened. Although the door panels 12 and 14 are shown receded from the inner lip 22 of the cover plate 18, the door panels 12 and 14 may further include a feature commonly known in the art as a "rabbet" (not shown) in order to maintain a smooth outer moldline surface near the self-closing access door 10. Accordingly, the spring-loaded hinge 16 may alternately be secured directly to the surrounding structure of the vehicle, wherein the vehicle structure may similarly incorporate the feature of a rabbet so that the entire self-closing access door 10 is flush with the outer moldline of the vehicle.

Figure 6:
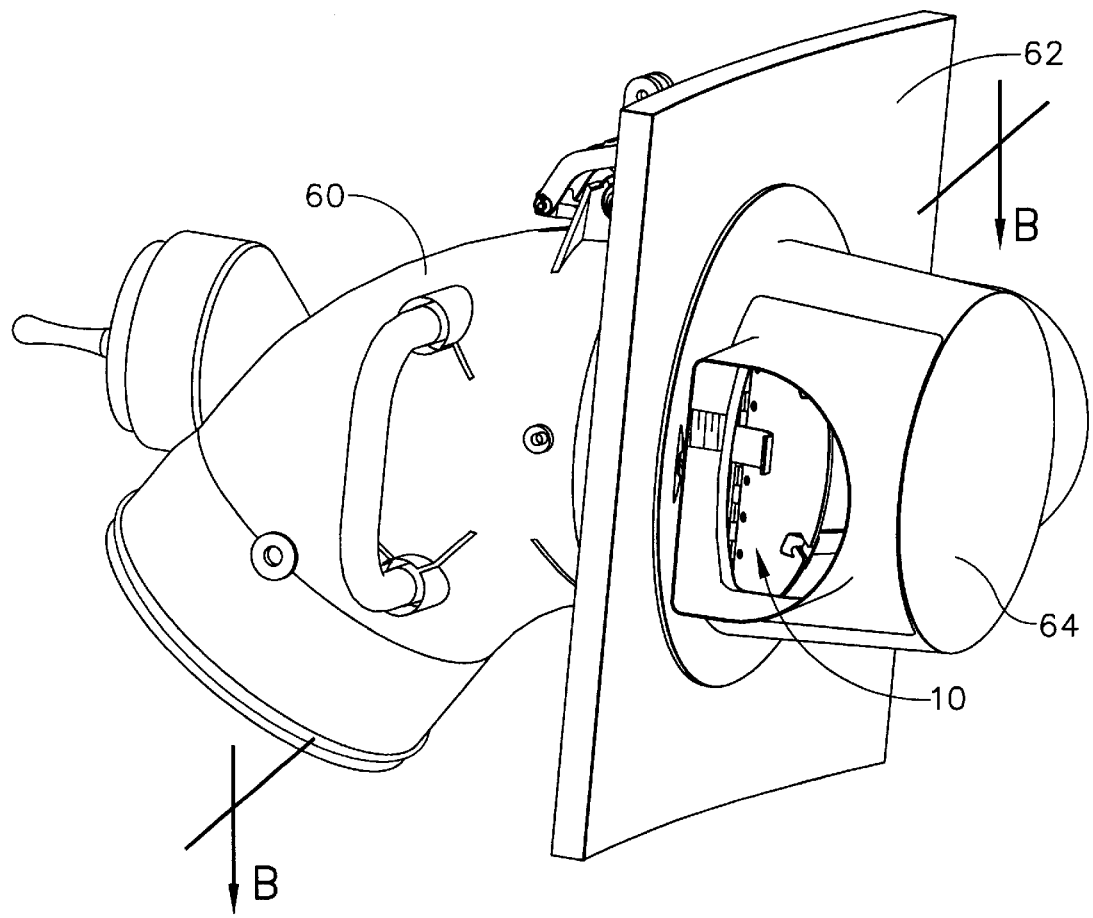
FIG. 6 is an orthogonal view of an external umbilical engaged with a self-closing access door in accordance with the present invention.
Figure 7:
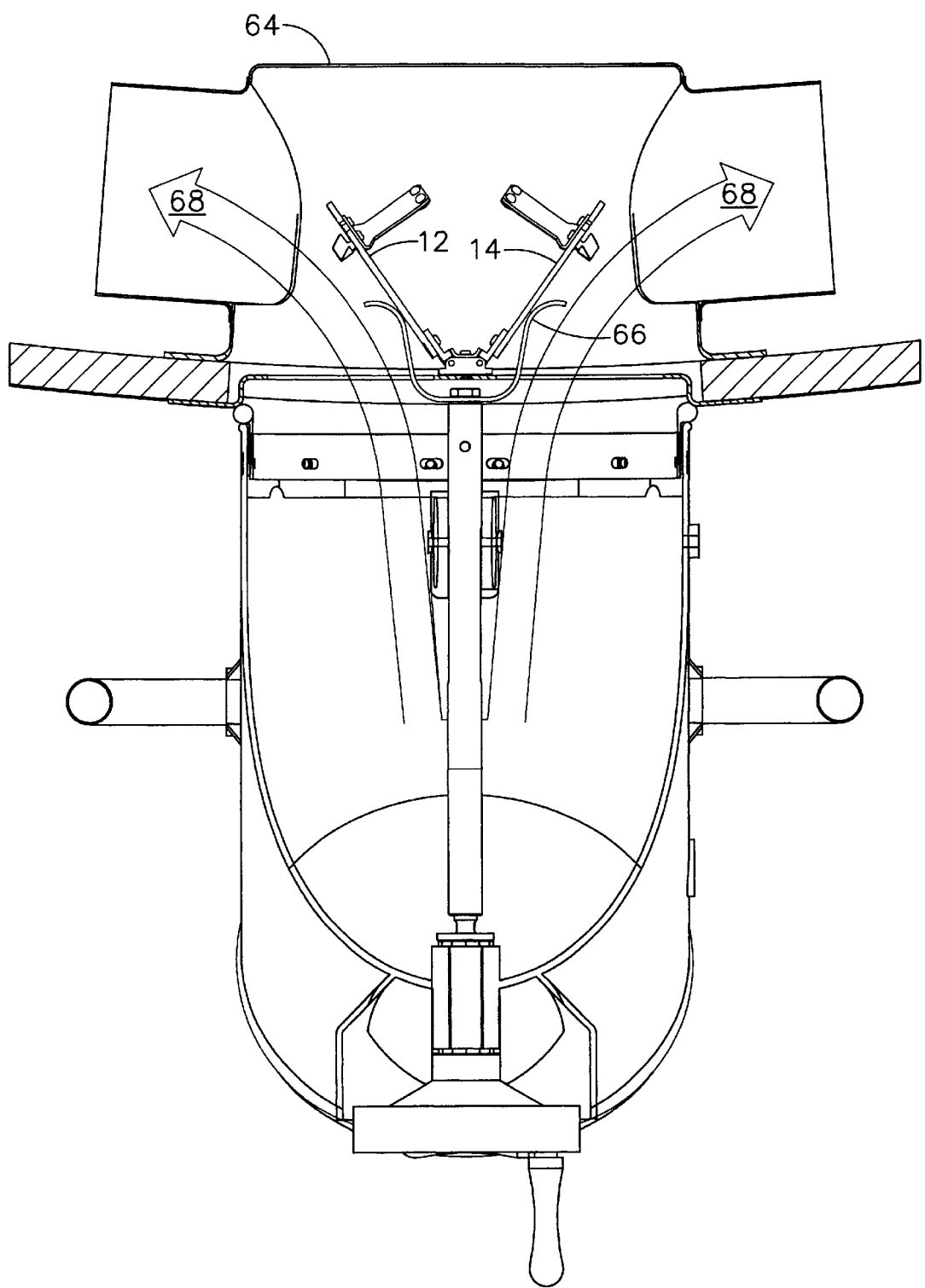
FIG. 7 is a cross-sectional view, taken along line B—B of FIG. 6, of an external umbilical engaged with a self-closing access door in accordance with the present invention.

Referring to FIGS. 6 and 7, the self-closing access door 10 is generally opened by an external umbilical 60 as shown. The external umbilical 60 abuts the outer moldline of the vehicle structure 62, wherein a manifold 64 and additional ducting (not shown) are positioned inside the vehicle structure 62 adjacent the external umbilical 60. In operation, the latches are first disengaged, and an external source such as a fork-shaped protrusion 66 is applied to open the door panels 12 and 14. Once the door panels 12 and 14 are open, fluid flow 68 (i.e., air conditioning) is induced through the self-closing access door 10 and into the manifold 64 as illustrated. The fluid flow 68 then travels further through additional ducting within the vehicle as necessary. When the door panels 12 and 14 must be closed, the fork-shaped protrusion 66 is removed and the spring-loaded hinge 16 forces the door panels 12 and 14 closed. Furthermore, the latches 24 firmly secure the door panels 12 and 14 in the closed position for subsequent flight operations.

Preferably, the spring-loaded hinge 16 is a commercial off the shelf (COTS) item. The cover plate 18, the door panels 12 and 14, the door stop 40, the latches 24, and the latch supports 26 are all preferably an aluminum material. Such parts are preferably formed from sheet aluminum, however, the parts may alternately be machined aluminum. Alternately, the parts may be a composite material, which may be formed using a variety of techniques commonly known in the art. For higher temperature applications, the parts may be a material such as titanium, an -imide based composite, or other high temperature material commonly known in the art.

The outer lip 20 of cover plate 18 is preferably attached to the surrounding structure of the vehicle using conventional fastening techniques commonly known in the art. The cover plate 18 may be pre-drilled prior to assembly or may alternately be match-drilled on assembly. Alternately, the cover plate 18 may be adhesively bonded to the surrounding structure of the vehicle or attached by other means commonly known in the art.

Although the self-closing access door 10 of the present invention preferably comprises two door panels, any number of door panels may be employed depending on the specific access door application. Moreover, any number of geometrical shapes for the door panels, surrounding structure, and cover plate may be employed as an alternative to the circular shapes illustrated herein. For example, access doors requiring a low radar signature may employ a diamond or triangular geometry for the door panels, surrounding structure, and cover plate.

Accordingly, a simple and reliable self-closing access door is provided by the present invention. The self-closing access door is furthermore light weight with a total weight of approximately three (3) pounds in one form compared with the fifteen (15) pound pan-shaped plug access door of the known art. As a result, critical weight may be saved from the launch vehicle, thereby improving payload and performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A self-closing access door comprising:
   a plurality of door panels;
   at least one latch secured to each one of the plurality of door panels; and
   a spring-loaded hinge secured to at least two of the plurality of door panels and to an internal surrounding structure supporting the plurality of door panels;
   wherein a first external source disengages the latches and then the door panels are displaced away from the surrounding structure by a second external source, and when the external source is removed from the door panels, the spring-loaded hinge forces the door panels closed against the surrounding structure.

2. The self-closing access door of claim 1 wherein when the second external source is removed from the door panels and the spring-loaded hinge forces the door panels closed, the latches secure the door panels to the surrounding structure.

3. The self-closing access door of claim 2 further comprising:
   a cover plate secured to the surrounding structure,
   wherein the latches secure the door panels to the cover plate when the spring-loaded hinges forces the door panels closed.

4. The self-closing access door of claim 3, wherein the cover plate further comprises an inner lip that is engaged by the latches to secure the door panels.

5. The self-closing access door of claim 4, wherein the latches further comprises a latch hook that engages the inner lip to secure the door panels.

6. The self-closing access door of claim 3, wherein the cover plate further comprises a lateral support, and the spring-loaded hinge is secured to the lateral support.

7. The self-closing access door of claim 3, wherein the cover plate further comprises an outer lip that is attached to the surrounding structure.

8. The self-closing access door of claim 2 further comprising:
   at least one latch support,
   wherein the latches are secured to the latch support and the latch support is secured to the door panels.

9. The self-closing access door of claim 2, wherein the at least two of the plurality of door panels include a first door panel, and a second door panel;
   a first latch secured to the first door panel; and
   a second latch secured to the second door panel;
   wherein the first latch secures the first door panel to the surrounding structure and the second latch secures the second door panel to the surrounding structure.

10. The self-closing access door of claim 9, wherein the spring-loaded hinge further comprises at least one door stop that prevents the first and second door panels from moving beyond a predetermined distance when opened by the external source.

11. The self-closing access door of claim 10, wherein the spring-loaded hinge further comprises tab portions, and the door stop further comprises flanges, such that when the door panels are opened, the tab portions of the spring-loaded hinge contact the flanges of the door stop to prevent movement of the door panels beyond a predetermined distance.

12. The self-closing access door of claim 9 further comprising:
   a third latch secured to the first door panel; and
   a fourth latch secured to the second door panel,
   wherein the latches secure the door panels to the surrounding structure.

13. The self-closing access door of claim 12 further comprising:
   a first latch support secured to the first latch and to the first door panel;
   a second latch support secured to the second latch and to the second door panel;
   a third latch support secured to the third latch and to the first door panel; and
   a fourth latch support secured to the fourth latch and to the second door panel,
   wherein the latch supports secure the latches to the door panels.

14. The self-closing access door of claim 12, wherein the latches further comprises a latch hook that engages the surrounding structure to firmly secure the door panels closed.

15. The self-closing access door of claim 1, wherein the spring-loaded hinge further comprises a hinge-line, and the hinge-line is alignable with a direction of flight of an aerospace vehicle.

16. A method of inducing fluid flow into a volume through a self-closing access door, the method comprising the steps of:

(a) providing a self-closing access door comprising a plurality of door panels, a spring-loaded hinge secured to at least two of the plurality of door panels and to surrounding structure supporting the at least two of the plurality of door panels, and at least one latch secured to each of the door panels;

(b) disengaging the latches with a first external force;

(c) opening the door panels outward from the surrounding structure with a second external source; and (d) removing the second external source;

wherein when the second external source is removed, the spring-loaded hinge forces the door panels closed against the surrounding structure and the latches secure the door panels to the surrounding structure.

17. The method of claim 16 further comprising the steps of:

(a) providing the plurality of door panels wherein the plurality of door panels includes a first door panel and a second door panel, wherein a second latch secured to the second door panel;

(b) opening the first door panel and the second door panel with an external source; and (c) removing the external source;

wherein when the external source is removed, the spring-loaded hinge forces the first door panel and the second door panel closed against the surrounding structure and the latches secure the door panels to the surrounding structure.

18. The method of claim 16 further comprising the steps of:

(a) providing a first door panel and second door panel, of the plurality of door panels;

(b) opening the first door panel with an external source; and (c) removing the external source, wherein when the external source is removed, the spring-loaded hinge forces the first door panel closed against the surrounding structure, and the latch secures the first door panel to the surrounding structure.

19. The method of claim 16 further comprising the steps of:

(a) providing a first door panel and second door panel, of the plurality of door panels and a second latch secured to the second door panel;

(b) opening the second door panel with an external source; and (c) removing the external source, wherein when the external source is removed, the spring-loaded hinge forces the second door panel closed against the surrounding structure, and the second latch secures the second door panel to the surrounding structure.

20. The method of claim 16, further comprising the step of:

(a) aligning a hinge-line of the spring-loaded hinge with a direction of flight of an aerospace vehicle.

21. A self-closing access door comprising:

a first door panel;

a second door panel;

a cover plate secured to surrounding structure supporting the door panels;

a spring-loaded hinge secured to the first door panel, the second door panel and to the cover plate;

a first latch secured to the first door panel;

a second latch secured to the second door panel;

a third latch secured to the first door panel; and a fourth latch secured to the second door panel;

wherein the door panels are displaced from the surrounding structure by an external source and when the external source is removed from the door panels, the spring-loaded hinge forces the door panels closed and the latches secure the door panels to the cover plate.

22. The self-closing access door of claim 21, wherein the spring-loaded hinge further comprises at least one door stop to prevent the first and second door panels from moving beyond a predetermined distance when opened by the external source.

23. The self-closing access door of claim 22, wherein the spring-loaded hinge further comprises tab portions, and the door stop further comprises flanges, such that when the door panels are opened, the tab portions of the spring-loaded hinge contact the flanges of the door stop to prevent movement of the door panels beyond a predetermined distance.

24. The self-closing access door of claim 21, wherein the cover plate further comprises an inner lip that is engaged by the latches to secure the door panels.

25. The self-closing access door of claim 24, wherein the latches further comprise latch hooks that engage the inner lip to secure the door panels.

26. The self-closing access door of claim 21, wherein the cover plate further comprises a lateral support, and the spring-loaded hinge is secured to the lateral support.

27. The self-closing access door of claim 21, wherein the cover plate further comprises an outer lip that is attached to the surrounding structure.

28. The self-closing access door of claim 21 further comprising:

a first latch support secured to the first latch and to the first door panel;

a second latch support secured to the second latch and to the second door panel;

a third latch support secured to the third latch and to the first door panel; and a fourth latch support secured to the fourth latch and to the second door panel, wherein the latch supports secure the latches to the door panels.

29. The self-closing access door of claim 21 wherein the spring-loaded hinge further comprises a hinge-line and the hinge-line is alignable with a direction of flight of an aerospace vehicle.

* * * * *